Nov. 22, 1938.   J. L. McCONNELL   2,137,536
ELECTRIC LAMP SOCKET STRIP AND WIRE HOUSING
Filed Aug. 12, 1937
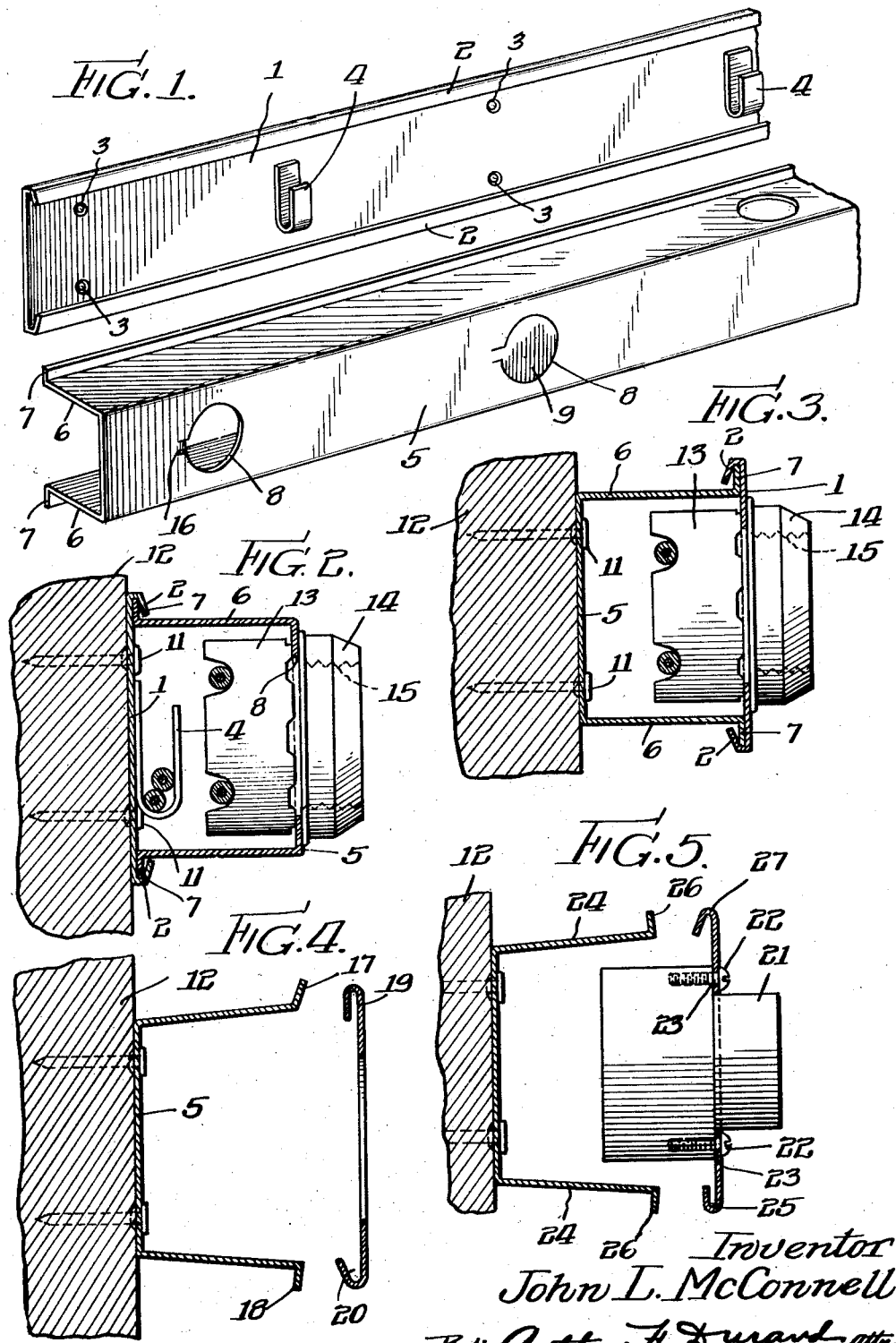
Inventor
John L. McConnell
By: Arthur H. Durand atty.

Patented Nov. 22, 1938

2,137,536

UNITED STATES PATENT OFFICE 2,137,536

ELECTRIC LAMP SOCKET STRIP AND WIRE HOUSING

John L. McConnell, Chicago, Ill.

Application August 12, 1937, Serial No. 158,722

2 Claims. (Cl. 247—37)

This invention relates to what are called lamp socket strips and wire housings for electric light work. In electrical construction work of this kind, it frequently becomes necessary to arrange electric lamps in rows, of different lengths, and for this purpose it is usual to employ sheet-metal housings for concealing the wires leading to the lamps.

Generally stated, therefore, the object of the invention is to provide a novel and improved construction and arrangement whereby, as one form or example of the invention, a lamp socket strip and wire housing of this kind is composed of two sections which detachably interlock along their longitudinal meeting edges, and whereby one section is provided with side walls which are flexible toward each other to detach this section from the other section of the housing, when it is necessary or desirable to obtain access to the wiring within the trough or housing, and whereby the lamp sockets are easily attached to the structure, on any one or all of the four flat sides thereof, thereby to provide a form of lamp socket strip that will facilitate both the original installation and the inspection afterward, or subsequent changes therein, of electric light wiring of this general character.

This is a continuation in part of application Serial No. 583,265, filed December 26, 1931.

It is also an object to provide certain details and features of construction and combinations tending to increase the general efficiency and the desirability of a wiring trough or housing construction of this particular character.

To the foregoing and other useful ends, the invention consists in the matters hereinafter set forth and claimed, and shown in the accompanying drawing, in which—

Fig. 1 is a perspective of the two sections of a wiring trough or housing embodying the principles of the invention, with their ends shown broken away for convenience of illustration, it being understood that these sections can be of any suitable or desired length.

Fig. 2 is a transverse section of the said wiring trough or housing in assembled condition, with the electric lamp sockets attached thereto, and with the wires indicated in place within the housing.

Fig. 3 is a similar transverse section, showing the housing mounted and employed in a somewhat different manner.

Fig. 4 is a cross section showing a different form of the invention.

Fig. 5 is a cross section showing another form of the invention.

As thus illustrated, referring to Figs. 1 to 3 inclusive, the invention comprises a substantially flat back plate or cover 1 having bent-over longitudinal edge portions 2, as shown. This flat plate or cover section of the housing is preferably provided with screw or nail holes 3, and with clips 4 to support the wires.

The other section of the housing comprises a sheet-metal trough-like section having a front wall 5, side walls 6, and out-turned longitudinal flanges 7, as shown. The front wall 5 may be provided with holes or openings 8 wherever lamp sockets are desired, or it may be provided with partially separated or knock-out portions 9 of any suitable form. The wires may be led in at the end of the trough or housing, or they may be led in laterally through the side of the trough, as through an opening 10 in one side thereof.

Referring to Fig. 2, it will be seen that, with one method of use, the back plate or cover 1 is secured in place by nails 11 inserted through the holes 3 into a support 12 of any suitable character. This support may be a side wall, or it may be the ceiling of a room, or it may be anything else, so long as it is suitable as a support for the electrical work to be supported thereby. The lamp sockets, preferably, are made in two sections 13 and 14, suitably secured together, after the two sections have been adjusted with a portion of one of the sections extending through one of the holes 8, or through one of the holes formed by pushing out one of the knock-out portions 9 previously mentioned. In this way, the sections of the lamp sockets are screwed together, by means of the screw threads 15, indicated in dotted lines in Fig. 2 of the drawing, and are thus clamped tightly upon the front wall 5 of the sheet-metal wiring trough or housing. The clips 4 may support the wires, as indicated, at various places, and the wires are connected to the inner ends of the lamp sockets in the usual and well-known manner.

In order to permit inspection of the wiring within the trough or housing, the walls 6 may be sprung or bent toward each other, thereby to disengage the flanges 7 from the retaining portions 2 of the back plate or cover, after the structure is assembled in the manner shown in Fig. 2 of the drawing. The lamp sockets and wires are first assembled within the trough section having the front wall 5 and the side wall 6, and the flanges 7 are then sprung into position, within the portions 2, in the manner shown. Thereafter, the portions 2 can be easily disengaged from the portions 7, by flexing the side walls 6 toward each other, should it become necessary to inspect or repair the wiring within the housing. To release the trough-shaped section from the substantially flat section of the housing, a tool can be provided, for insertion under the portions 2, thereby to spring the portions 7 out of interlocking engagement with the portions 2, when it is desired to open up the housing after the installation thereof.

As shown in Fig. 3 of the drawing, the position of the housing as a whole is reversed, and the nails 11, previously mentioned, are inserted through the front wall 5 of the trough-shaped housing section, and the electric-lamp socket sections 13 and 14 are inserted through holes or openings, made for that purpose, in the flat wall or cover 1, whereby the lamp sockets are supported at the outer side of the housing in the desired manner. This arrangement may be employed, in certain situations, instead of the other arrangement shown.

The two sections of the housing can be made in long lengths, and these long lengths can be cut up into shorter lengths, of whatever length is necessary for different portions of the work. The subdivision of the long sections can be done in the factory, or it can be done where the electrical work is being installed. In this way, the construction results in a reduced cost of production of the trough or housing, and the cost of installation thereof is also materially reduced, as compared with wiring troughs or housings heretofore employed in this kind of work.

The material for the trough or housing may be sheet metal of any suitable or desired character, such as ordinary galvanized sheet iron.

It is also obvious, of course, that the trough or housing construction shown and described may be employed as an ordinary raceway, for the main wires or conductors, in electric light work of this kind. When used as a raceway, the wires within the housing would have leads therefrom extending into the adjacent trough or housing upon which the electric lamp sockets are mounted. In other words, the raceways and the lamp socket supports are ordinarily arranged parallel with each other, and the taps or leads from the raceway box or housing are taken at intervals along the length thereof into the lamp-socket box or housing, in the well-known manner. Therefore, as indicated, the invention is not limited to use as a lamp socket box or mounting, to conceal the wires by which the lamp sockets are connected in multiple, but may also be used to conceal the main wires or conductors from which the leads are taken that feed current to the lamp sockets.

It will be understood that either nails or screws can be inserted through the holes 3 to mount the section 1 upon a wall or other support. It will also be understood that similar holes can be formed in the wall 5 of the trough-shaped or channel-like section of the housing, whereby this section can be secured to a wall or other support.

It will be seen that the notches 15 for the holes 8, by proper engagement with the light sockets, prevent these sockets from rotating in said holes or openings.

It will be seen, of course, that the two sections can be separated, when they are used in relatively short lengths, by endwise sliding motion, instead of by flexing the side walls of one of the sections. Moreover, the hooks 4 can be used on the section wall 5, in a similar manner, if so desired. As shown in Fig. 2, the so-called feeder wires are supported in the hooks 4, for the main circuits. The wires for the branch circuits leading to the lamp sockets are indicated as being properly supported in the notches of the inner ends of the lamp socket. It is also obvious that the two sections can be suitably formed, more or less like each other, or reversed, so to speak, without departing from the spirit of the invention.

It will be seen that the flat flanges 7 are in the same plane, and that they preferably rest flatwise against the inner surface of the plate 1, regardless of whether the latter or the trough is fastened to a support. Thus these flanges 7 strengthen the structure, and in either form of the invention the plate 1 provides the maximum width of the housing.

The housing, it will be seen, is rectangular in cross section, all four walls being flat, and it is apparent that each and every flat wall may have holes therein for lamp bulb sockets, or for lead wires, or that each and every flat wall may be left plain, if so desired, depending upon the character of the work. In any event, two of said walls are flexible toward each other, to disengage their retaining flanges from the other section of the housing, and if lamp bulb sockets are inserted through the bottom wall of the channel member, or through the cover plate, there is sufficient clearance at each side to permit the flexing of the side walls in the manner stated. Also, the fastening means 11 are insertable through either the flat plate cover, or through the bottom of the channel, but in either case they are concealed within the interior of the housing, and are only accessible by removing one section of the housing from the other. In this way there is exceptional and unusual flexibility in the use of this housing, as it can be used in various ways, depending upon the results sought to be attained.

Furthermore, it will be seen that the lamp sockets, when fixed in holes formed in the housing, provide sockets of standard form or size on the exterior of the housing, whereby lamps are connected or disconnected without the use of any separable connections within the housing, and by merely screwing or unscrewing the bulbs into or from the exterior sockets fixed in one wall of the housing.

Thus the structure provided is a combined lamp support and cable housing, and by cable is meant either large or small insulated electrical conductors, or electrical conductors of any desired character, so that any lamp sockets fixed on the housing can be supplied with electric current.

It will also be seen that with the particular construction and arrangement shown and described, which is illustrative of the invention, the lamp sockets are first fastened in place, to either section of the housing, and the wiring connections are then made, conveniently and inexpensively, and the two sections of the housing are then snapped into engagement with each other.

Of course, as the housing is rectangular in cross section, and has four single thickness walls, the lamp sockets can be placed in holes such as those shown in any one of the said four flat walls. Also, either the trough formed by the walls 5 and 6 or the plate 1 can be disposed uppermost, thereby to support the other, without any danger of the one disposed lowermost dropping off or becoming detached, as either one is amply able to support the entire weight of the housing, and the contents of the latter, in an overhead position.

It will be seen that each of the holes 8 and 10 is perfectly flat and round, with the edges of each hole in the same plane, so that anything attached to these holes, or so that any use of these holes, will be effective for the desired purpose.

In Fig. 4 the construction is similar to that previously described, but in this case one flange 17 is at one angle, while the flange 18 is at a different angle, and the cover plate has a tight fit at 19 on the flange 17, and has a somewhat loose fit at 20, on the flange 18, so that when the two members are interengaged the flange 17 will be under tension and will tend to hold the cover closed at the other edge thereof.

In Fig. 5 of the drawing, a different form of plug 21 is employed, requiring the fastening thereof in place by screws 22 inserted through screw holes 23 at opposite sides of each hole 8 in the wall. In this way the different kinds of lamp sockets can be used, on one and the same lamp strip. In addition, it will be seen that the side walls 24 are slightly flared apart, when the cover member is removed, so that these walls are under tension when the two members are interconnected, and it will be seen that this is the same in Fig. 4 of the drawing. Also, in Fig. 5, the cover plate has a tight fit at 25 at one side, on the flange 26 of the channel, and has a somewhat loose fit at 27 on the other flange 26, of this construction. This means that the engagement at one side of the cover is different from what it is at the other, in a manner to facilitate the connection and disconnection of the two members.

It will be seen, therefore, that each form of the invention contemplates, primarily, a flat plate of sheet metal having rebent flanges at the edges thereof, this plate being adapted to be secured to a supporting surface, and, in combination therewith, a sheet metal channel member having knockout plugs adapted to be removed to provide openings for reception of outlet sockets at desired points, and having further out-turned flanges along the edges of the channel for interengagement with the flanges of the said plate member, whereby the wiring and outlet sockets may be preassembled in the channel member and the flanges of the latter then snapped into engagement with the flanges of the plate member, so that each form of the invention contemplates a sheet metal channel member which can be preassembled as stated and then detachably interengaged with the flat sheet metal plate member which has been previously fastened to a support, thereby greatly facilitating the assembling of the wires and sockets and sheet metal sections of the housing together, after one member has been fastened to a support.

What I claim as my invention is:

1. A combined electrical conduit and outlet housing comprising a flat sheet metal plate section having rebent flanges, adapted to be secured to a supporting surface, and a sheet metal channel-like section having knockout plugs adapted to be removed to provide openings for reception of outlet sockets at desired points and having further outturned flanges along the edges of the channel for interengagement with the flanges of the plate section, whereby the wiring and outlet sockets may be preassembled in the channel member and the flanges of the channel snapped into engagement with the flanges of the plate member.

2. A structure as specified in claim 1, in which the flanges of said plate are disposed at substantially different angles, providing a tight fit at one side and a loose fit at the other side.

JOHN L. McCONNELL.